US011632257B2

(12) United States Patent
Hsiao (10) Patent No.: US 11,632,257 B2
(45) Date of Patent: Apr. 18, 2023

(54) POWER OVER ETHERNET SYSTEM HAVING MULTIPLE POWER SOURCE DEVICES (71) Applicant: IC Plus Corp., Hsinchu (TW)

(72) Inventor: Chef Hsiao, Hsinchu (TW)

(73) Assignee: IC PLUS CORP., Hsinchu (TW)

(*) Notice: Subject to any disclaimer, the term of this patent is extended or adjusted under 35 U.S.C. 154(b) by 0 days.

(21) Appl. No.: 17/970,022

(22) Filed: Oct. 20, 2022

(65) Prior Publication Data
US 2023/0046723 A1 Feb. 16, 2023

Related U.S. Application Data (62) Division of application No. 17/383,467, filed on Jul. 23, 2021, now Pat. No. 11,509,492.

(30) Foreign Application Priority Data

Dec. 24, 2020 (TW) ................... 109145956

(51) Int. Cl.
G06F 1/26 (2006.01)
H04L 12/10 (2006.01)
H04L 12/40 (2006.01)
G06F 1/30 (2006.01)

(52) U.S. Cl.
CPC .............. H04L 12/10 (2013.01); G06F 1/266 (2013.01); G06F 1/30 (2013.01); H04L 12/40045 (2013.01)

(58) Field of Classification Search
CPC ... H04L 12/10; H04L 12/40045; G06F 1/266; G06F 1/30
See application file for complete search history.

(56) References Cited

U.S. PATENT DOCUMENTS

| | | | | |
|---|---|---|---|---|
| 7,908,494 | B2* | 3/2011 | Hussain | H04L 12/10 713/300 |
| 8,074,084 | B2* | 12/2011 | Karam | H04L 12/10 713/340 |
| 8,595,516 | B2* | 11/2013 | Panguluri | G06F 1/266 713/340 |
| 8,676,393 | B1* | 3/2014 | Hupton | H02J 3/14 700/291 |
| 8,788,865 | B2* | 7/2014 | Mohammed | H04L 12/10 713/340 |
| 9,377,794 | B1* | 6/2016 | Dwelley | G05F 1/462 |
| 10,172,214 | B2* | 1/2019 | Van Endert | H04L 12/10 |
| 11,175,722 | B2* | 11/2021 | Atkinson | G06F 1/3206 |
| 2005/0272402 | A1* | 12/2005 | Ferentz | H04L 12/10 713/320 |
| 2006/0082222 | A1* | 4/2006 | Pincu | G06F 1/3203 307/29 |

(Continued)

Primary Examiner — Aurel Prifti
(74) Attorney, Agent, or Firm — Bacon & Thomas, PLLC (57) ABSTRACT Power over Ethernet system having multiple power source devices comprising a control device that controls power distribution to a plurality of communication ports. In the control device, a master controller provides a power supply to power consumption look-up-table to a plurality of control circuits in various manners via a series bus. When one power source device shuts down, each control circuit can rapidly shut off selected port switches connected thereto.

25 Claims, 5 Drawing Sheets (56) References Cited

U.S. PATENT DOCUMENTS

| | | | |
|---|---|---|---|
| 2008/0244282 A1* | 10/2008 | Hansalia | G06F 1/266 |
| | | | 713/300 |
| 2010/0017631 A1* | 1/2010 | Karam | H04L 12/10 |
| | | | 370/352 |
| 2010/0106985 A1* | 4/2010 | Panguluri | G06F 1/266 |
| | | | 713/300 |
| 2011/0040991 A1* | 2/2011 | Wu | G06F 1/3287 |
| | | | 713/310 |
| 2012/0066519 A1* | 3/2012 | El-Essawy | H04L 67/12 |
| | | | 713/300 |
| 2014/0245031 A1* | 8/2014 | Hamdi | G06F 1/3209 |
| | | | 713/300 |
| 2014/0292070 A1* | 10/2014 | Poh | H04L 12/40045 |
| | | | 307/23 |
| 2016/0064938 A1* | 3/2016 | Balasubramanian | H04L 12/10 |
| | | | 307/11 |
| 2017/0149574 A1* | 5/2017 | Huang | G06F 1/266 |
| 2018/0091319 A1* | 3/2018 | Huang | H04L 12/10 |
| 2018/0139064 A1* | 5/2018 | Tarn | H04B 3/548 |
| 2020/0076626 A1* | 3/2020 | Yam | G06F 1/28 |
| 2021/0266188 A1* | 8/2021 | Goergen | G06F 1/266 |

* cited by examiner

POWER OVER ETHERNET SYSTEM HAVING MULTIPLE POWER SOURCE DEVICES

TECHNICAL FIELD OF THE INVENTION

The present invention relates to a power-over-Ethernet (PoE) system and a control device useful in the system, in particular to a PoE system with a plurality of power source devices, and a control device used in such a system.

BACKGROUND OF THE INVENTION

Prior Art

In a wired communication network, supplying electrical power to devices on the network through network cables is already a mature technology. For example, the Power over Ethernet (PoE) power supply system, which is powered by the wiring of the Ethernet, has gradually become popular, due to its advantages in reducing installation costs, as well as centralized power supply and power backup, and safety management. Currently most PoE systems follow the IEEE 802.3af-2003 standard, which is incorporated herein for reference.

The PoE system provides a scalable function, with which in the initial operation stage, the system can automatically or manually configure its power distribution to the limited number of communication ports in the system. As time passes, the system can also detect the power supply state automatically, and increase or decrease the number of ports to receive electrical power, based on the detection results in the power supply state. Each communication port is connectable by one power consuming device, to receive electrical power from the system.

There are methods to increase power supply in a PoE system. One of the methods is to use multiple power source devices or multiple groups of power supply. The plurality of power source devices is connected to one or more control element in parallel, which control element then supplies or distributes the electrical power of the plural power source devices to individual power consuming devices. Power source devices of non-PoE system can also apply power to the PoE system, to increase its supplied power, as long as the sum of the PoE power supply and the non-PoE power supply can be distributed to one or more loads via Ethernet wire/cables.

In a power supply system wherein a plurality of power source device is used, an important technical problem to be overcome is how to immediately stop supplying power to particular power consuming devices, i.e., to particular ports, when one or more of the plural power source devices shuts down or reduces its output power, in order to avoid the occurrence of overloading on the remaining supplied power. Further, in order to prevent impacts on the remaining power consuming devices due to a shutdown or low-power status, it is also necessary to stop supplying power to the particular power consuming devices immediately or within a very short time, usually within 20 ms, preferably within 2 ms. If the total power consumption of all the connected power consuming devices cannot be reduced within that period, the total system would shut down during the emergency power-off operation.

The prior art has proposed several solutions to this demand, especially means to quickly stop supplying power to sufficient number of power consuming devices, when one or more power source devices fail.

U.S. Pat. No. 7,337,336 No. discloses a "Method for rapid port power reduction," useful in a PoE system with multiple power source devices and allowing quickly reducing or stopping power supplied to particular ports, when the power supply state changes. The method comprises the steps of: Coding of possible power supply states. For example, if the system has 4 power source devices, code 1 is assigned to a power source device in normal operation, while code 0 is assigned otherwise. In this way, 16 power supply state codes can be assigned to represent all possible power supply states. For each of the 16 power supply state codes, a power supply index is assigned, which index indicates ports to be supply power (code 1) and ports not to be supply power (code 0). All power supply state code-power consuming index assignments thus form a look-up-table. When the power supply state of any power source device changes, the change is detected, whereby a new power supply state code is generated. Thereupon, a new power consuming index combination is picked up from the look-up-table, and executed. That is, power supplied to ports coded 0 is shut off, while power supplied to ports coded 1 is maintained.

U.S. Pat. No. 7,908,494 discloses a system and method for multiple power over Ethernet (PoE) power supply management. Power supply state signals indicative of an operating condition of a plurality of PoE power supplies are provided to a plurality of power sourcing equipment (PSE) controller chips. Pre-configured combination logic within each of the PSE controller chips converts an indicated operational state of the plurality of PoE power supplies into a powering decision for each of the Ethernet ports served by the PSE controller chip within one microsecond.

Although the immediate power shutting off operation is activated by a change in the power supply state combination, an operation would be activated wherever the power supply state of one power source device changes. It is possible to wire together the power supply state signals with a single state input signal and use the single state input signal to activate the change. This is disclosed in U.S. 2007/0250218, title of the invention: Power management logic that reconfigures a load when a power supply fails.

A method for immediately shutting off power supply to predetermined ports upon change of power supply state is disclosed in TW 2017/29564, "Power source devices and method for power over Ethernet power supply system." The method continuously detects specific communication ports to obtain the power consumption value along the time axis of the power consuming devices connected to the communication ports, and then determines a power consumption trend value. When the trend value shows that the power consumption of a power consuming device exceeds a power supply upper limit for a predetermined time, the power supply to the power consuming device is stopped.

It can be known from the prior art that, although the conventional emergency power-off mechanism can quickly shut off certain ports, it is only suitable for systems with a small number of power consuming devices. When the number of power consuming devices reaches a considerable level, especially when the ratio of the number of power consuming devices to the number of power source devices is great, the length of the assigned code will be too long and the selectivity will be greatly reduced. Shutting off power supply to particular ports will become difficult.

In addition, when the ratio of the number of power consuming devices to the number of power source devices is too high, the selectivity of communication ports for shutting off will be limited; it is not possible to select the target ports dynamically. Therefore, the scalability requirements of the PoE system cannot be met.

SUMMARY OF THE INVENTION

One objective of the present invention is to provide a control device for power over Ethernet system having multiple power source devices, which can rapidly reduce or stop the electrical power supplied to specific ports when a power source device fails.

Another objective of the present invention is to provide a control device for power over Ethernet system having multiple power source devices, which can rapidly reduce or stop the electrical power supplied to specific ports when a power source device fails, and is suitable for a system with a greater number of power source devices and power consuming devices.

Another objective of this invention is also to provide a control device for power over Ethernet system having multiple power source devices, which can rapidly reduce or stop the electrical power supplied to specific ports when a power source device fails, and can dynamically select appropriate power consuming device to reduce or stop the power supply in compliance with the reduction or increase in the number of the power consuming devices.

Another objective of the present invention is also to provide a control method useful in the above-mentioned control device for PoE system with multiple power source devices.

According to a first aspect, the present invention provides a control device for power over Ethernet system having multiple power source device. The control device comprises:

a master controller, comprising:

an input terminal, for connecting a plurality of power source devices to receive a power supply state signal representing a combination of power supply state of the plurality of power source devices;

a detection circuit connected to the input terminal for detecting the power supply state signal and for generating a power supply state change signal, when a power supply state signal received by the detection device is different from a previously received power supply state signal;

a first look-up-table memory to store a power supply to power consumption look-up-table defining a corresponding relation of a plurality of power supply state combination to a plurality of power consumption control combination; and a control signal generating circuit connected to the detection circuit and configured to: generate, upon receipt of a power supply state change signal, a power supply state code corresponding to the received power supply state signal;

a plurality of control circuit connected to the master controller and a plurality of port switch, each port switch controlling a power consumption state of at least one port to be connected by a power consuming device; each control circuit being configured to generate, upon receipt of the power supply state code, a power consumption control signal corresponding to the power supply state code and to provide the power consumption control signal to corresponding port switches, to determine a power ON/OFF state of corresponding ports; and a signal bus connected to the master controller and the plurality of control circuits; wherein, the signal bus is a serial bus. In a preferred embodiment of the present invention, the signal bus uses the IIC communication protocol.

In the preferred embodiments of the present invention, each control circuit may further comprise a second look-up-table memory, to store a second power supply to power consumption look-up-table, defining a corresponding relation of a plurality of power supply state combination and a plurality of power consuming control combination, wherein each of the plurality of power consuming control combination corresponds to a power consuming state combination of port switches in connection with the control circuit.

In the preferred embodiments of this invention, the first and/or second power supply to power consumption look-up-table defines a corresponding relation between a plurality of power supply state signals and a plurality of power consumption control signals, and/or between a plurality of power supply state codes and a plurality of power consumption control signals.

In such embodiments, the master controller may be configured to: in the initial stage of the system, provide the first power supply to power consumption look-up-table stored in the first look-up-table memory to the plurality of control circuit; the control signal generating circuit is configured to convert, upon detection of a change in the power supply state signal, the received power supply state signal into a code and provide the code to the plurality of control circuits as the power supply state code; and the plurality of control circuit is configured to: after receiving the first power supply to power consumption look-up-table provided by the master controller, store the first power supply to power consumption look-up-table in the second look-up-table memory, and to pick up, after receiving the power supply state code, one corresponding power consumption control signal from the power supply to power consumption look-up-table stored in the second look-up-table, and provide the power consumption control signal to port switches in connection with the control circuit.

In a preferred embodiment of the present invention, the power supply state signal comprises a code with the same number of digits as the number of the plurality of power source devices. In a specific embodiment of the present invention, the power supply state change signal is result of a conversion of the power supply state signal.

In a specific preferred embodiment of the present invention, the power supply state change signal is the result of converting the received power supply state signal into a serial signal. In this embodiment, the at least one control circuit picks up a power consumption control signal corresponding to the power supply state change signal from the power supply to power consumption look-up-table.

In such preferred embodiments of the present invention, the at least one control circuit provides the picked-up power consumption control signals to other control circuits via the signal bus; and the receiving control circuits are respectively configured to: provide, after receipt of the power consumption control signals, the power consumption control signals to the port switches connected to the corresponding control circuit.

According to a second aspect of the present invention, the present invention provides a control device for power over Ethernet system having multiple power source devices. The system comprises:

a plurality of power source devices;

a plurality of communication ports, each communication port to be connected by a power consuming device, to establish a signal and power connection with the power consuming device; each communication port having a port switch to control power consumption state of the port;

a control device in connection with the plurality of power source devices and the plurality of communication ports via a network cable, to convert power supplied by the power source devices into electrical power useful for power consuming devices connected to corresponding communication ports, and to generate power consumption control signals for control of an ON/OFF state of port switches connected thereto.

The control device comprises:

a master controller, comprising:

an input terminal, for connecting a plurality of power source devices to receive a power supply state signal representing a combination of power supply state of the plurality of power source devices;

a detection circuit connected to the input terminal for for detecting the power supply state signal and for generating a power supply state change signal, when a power supply state signal received by the detection device is different from a previously received power supply state signal;

a first look-up-table memory to store a first power supply to power consumption look-up-table defining a corresponding relation of a plurality of power supply state combination and a plurality of power consumption control combination; and a control signal generating circuit connected to the detection circuit and configured to: upon receipt of a power supply state change signal, generate a power supply state code corresponding to the received power supply state signal;

a plurality of control circuit connected to the master controller and a plurality of port switch, each port switch controlling a power consumption state of at least one port to be connected by a power consuming device;

wherein each control circuit is configured to: upon receipt of the power supply state code, generate a power consumption control signal corresponding to the power supply state code and provide the power consumption control signal to corresponding port switches, to determine a power ON/OFF state of corresponding ports; and a signal bus connected to the master controller and the plurality of control circuits; wherein, the signal bus is a serial bus. In a preferred embodiment of the present invention, the signal bus uses the IIC communication protocol.

According to a third aspect of the present invention, the present invention provides a control device for power over Ethernet system having multiple power source devices. The control device comprises:

a master controller, comprising:

an input terminal, to receive a power supply state signal representing a combination of power supply state of the plurality of power source devices;

a detection circuit connected to the input terminal for detecting the power supply state signal and for generating a power supply state change signal, when a power supply state signal received by the detection device is different from a previously received power supply state signal;

a first look-up-table memory to store a first power supply to power consumption look-up-table defining a corresponding relation of a plurality of power supply state combination and a plurality of power consumption control combination; and a control signal generating circuit, connected to the detection circuit and configured to: upon receipt of a power supply state change signal, pick up a power consumption control signal corresponding to the received power supply state signal from the power supply to power consumption look-up-table;

a plurality of control circuit connected to the master controller and a plurality of port switch, each port switch controlling a power consumption state of at least one port to be connected by a power consuming device;

wherein each control circuit is configured to provide the power consumption control signal to corresponding port switches, upon receipt of the power consumption control signal, to determine a power ON/OFF state of corresponding ports; and a signal bus connected to the master controller and the plurality of control circuits; wherein, the signal bus is a serial bus. In a preferred embodiment of the present invention, the signal bus uses the IIC communication protocol.

In such embodiments, the control signal generating device is configured to: upon receipt of a power supply state change signal, pick up a power consumption control data corresponding to the received power supply state signal from the first power supply to power consumption look-up-table, to generate one or more power consumption control signal, and provide the one or more power consumption control signal to the plurality of control circuit via the signal bus. In addition, each control circuit may be configured to: upon receipt of the one or more power consumption control signal, provide a corresponding power consumption control signal to a corresponding plurality of port switch. In most embodiments of the present invention, the one or more power consumption control signal comprises a code indicative of related control circuits. In such embodiments, the quantity of the control circuit is identical or is a multiple of the number of the power consumption control signal.

In the preferred embodiments of this invention, the first power supply to power consumption look-up-table defines a corresponding relation between a plurality of power supply state signals and a plurality of power consumption control signals, and/or between a plurality of power supply state codes and a plurality of power consumption control signals.

According to the fourth aspect of the present invention, the present invention provides a power over Ethernet system having multiple power source devices. The PoE system comprises a plurality of power source devices, a plurality of power consuming communication ports and a control device with the above-described features.

According to the fifth aspect of the present invention, the present invention provides a control device for power over Ethernet system having multiple power source device. The control device has the features of the first aspect of the present invention, while the master controller is configured to: in the initial stage of the system, divide the first power supply to power consumption look-up-table stored in the first look-up-table memory into a plurality of sub-tables and provide the sub-tables to corresponding ones of the plurality of control circuits; and the plurality of control circuits is configured to: after receiving the sub-table provided by the master controller, store the sub-table in the second look-up-table memory, and to pick up, after receiving the power supply state code, a corresponding power consumption control signal from the second power supply to power consumption look-up-sub-table, and provide the power consumption control signal to the port switches in connection with the control circuit.

In the fifth aspect of the invented control device for power over Ethernet system having multiple power source device, the master controller can also be configured as one of the plurality of control circuits. That is, the master controller is also connected to a plurality of port switches and is configured to pick up a power consumption control signal corresponding to a power supply state code from the first power supply to the power consumption look-up-table, or a sub-table thereof, after the power supply state code is generated, and to provide the picked up power consumption control signal to the port switches in connection with the master controller.

According to the sixth aspect of the present invention, the present invention provides a power over Ethernet system having multiple power sources. The system comprises a plurality of power source devices, a plurality of power consuming communication ports and a control device comprising the above-described features.

Other objectives, features, and advantages of the present invention can be appreciated clearly from the detailed description of the preferred embodiments by referring to the drawings. It should be noted that the description of the embodiments of the present invention is only intended to illustrate the main technical content, features, and effects of the present invention, and is not intended to limit the scope of the present invention. It is obvious for the skilled persons n this industry to derive various changes and applications based on the description of the embodiments. As long as they do not depart from the scope of the attached patent claims, they are all within the scope of the present invention.

DETAILED DESCRIPTION OF THE INVENTION

In the following, several embodiments of the invented power over Ethernet system having multiple power source devices and its control device will be described by reference to the drawings, so to demonstrate the design, features and effects of the present invention.

Figure 1:
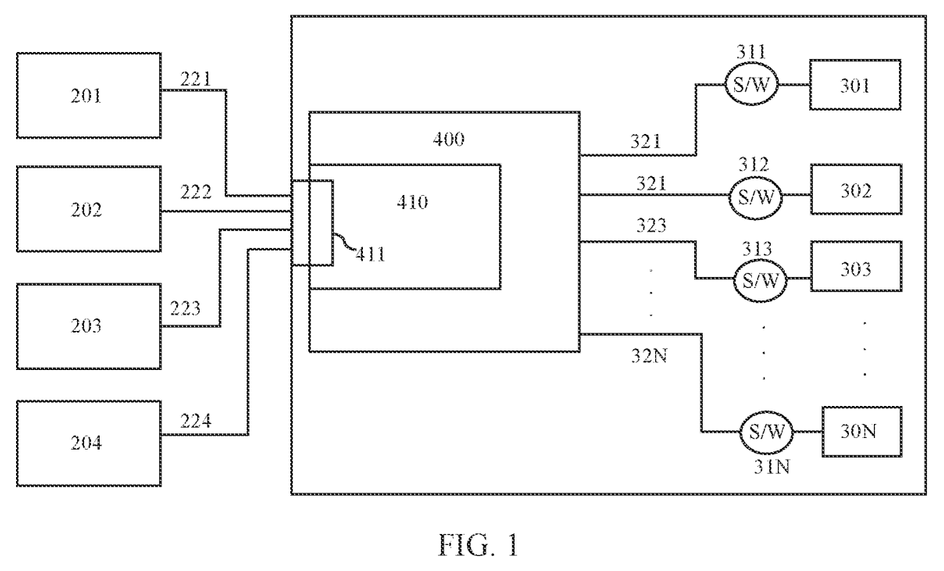
FIG. 1 shows a schematic diagram of a Power over Ethernet system having multiple power source devices.

FIG. 1 shows a schematic diagram of a Power over Ethernet system having multiple power source devices. The PoE system having multiple power source devices in which the invented control device is used, is already a known technology. A PoE system usually comprises a plurality of power source devices 201-204, a plurality of communication ports 301, 302, 303, . . . 30N, and a control device 400. As is well known, the plurality of power source devices 201-204 are usually a computer equipment or a network equipment, but may also be simply a power supply or other devices whose main purpose is to supply electrical power. The communication ports 301, 302, 303, . . . 30N can be connected by power consuming devices (not shown), so to establish a signal and power connection with the power consuming devices. Typical power consuming devices are networked computer equipment, network equipment, peripherals such as laser printers, telephones, scanners, cameras, projectors, monitors, microphones, headphones, intelligent household appliances. It may also be just an electrical load, such as LED lights and general household appliances. As shown in IG. 1, each communication port 301, 302, 303, . . . 30N has a port switch 311, 312, 313, . . . 31N to control power supplied thereto. As will be explained below, each port switch 311, 312, 313, . . . 31N is connected to the control device 400, and is controlled by the control device 400 to switch on or off.

The control device 400 is in connection with the plurality of power source device 201-204 via an input terminal 411 and network lines 221-22, and with the plurality of communication port 301, 302, 303, . . . 30N via signal lines 321-32N. The control device 400 converts electrical power supplied by the power source devices 201-204 into electrical power useful by power consuming devices in connection with the communication ports 301, 302, 303, . . . 30N. The power over Ethernet system having multiple power source devices with the above architecture, features and functions is already a mature technology and is widely used all over the world. There are also detailed descriptions in the prior art disclosures mentioned above. Readers can refer to them, if necessary for further research.

The main objective of the present invention is to provide a control device 400 with a novel architecture and a control method applicable in the control device 400, to distribute the electrical power of the plurality of power source devices 201-204 to the plurality of communication ports 301, 302, 303, . . . 30N, especially when one of the plurality of power source devices 201-204 fails, so that the electrical power provided by the remaining power source devices may be properly distributed to the plurality of communication ports 301, 302, 303, . . . 30N.

Figure 2:
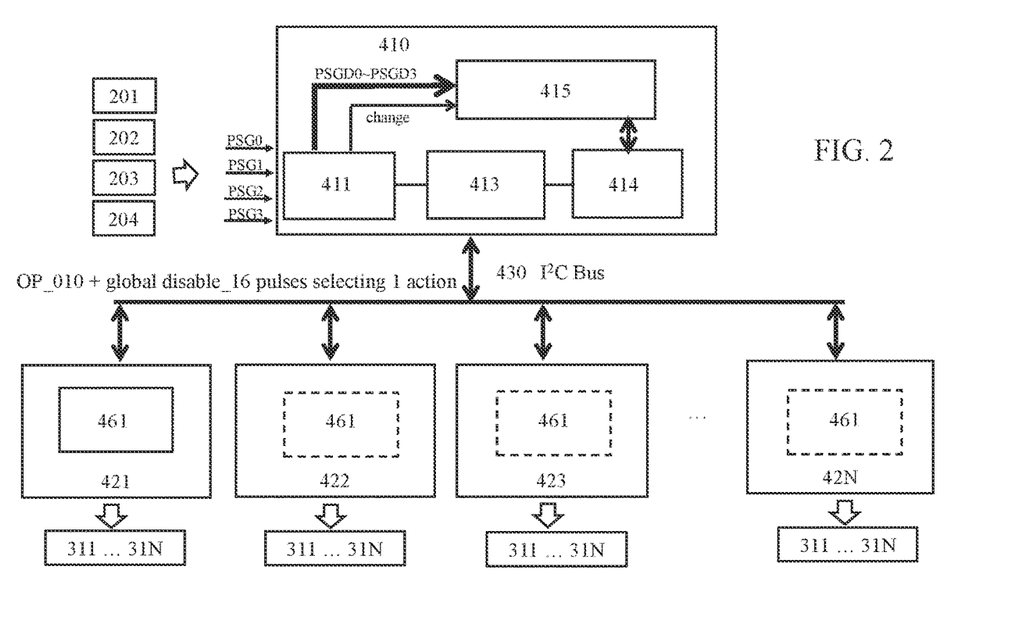
FIG. 2 shows a schematic structural diagram of an embodiment of the invented control device for power over Ethernet system having multiple power source device.

FIG. 2 is schematic structural diagram of one embodiment of the invented control device for PoE system having multiple power source device. As shown in this figure, the control device 400 includes a master controller 410, a plurality of control circuits 421-42N, and a signal bus 430 connecting the two. The other end of the plurality of control circuit 421-42N is respectively connected to the port switches 311-31N, and each port switch 311-31N controls the power consuming state of at least one communication port 301-30N, and each communication port 301-30N can be connected by a power consuming device, so that electrical power and/or signal is provided to each power consuming device.

Also shown in the figure, the master controller 410 has an input terminal 411, which includes a plurality of power connectors for connecting a plurality of power source devices 201-204, to receive a power supply state signal representing a combination of power supply states of the plurality of power source devices. FIG. 2 shows that the input terminal 411 is connected to 4 power source devices 201-204. However, the number of power source devices that a PoE system can use is not particularly limited. In addition, although the main purpose of the power connectors is to detect and control, it can also be the transmission channel of the electrical power for the power source devices 201-204, for supplying power to the plurality of communication ports 301, 302, 303, . . . 30N.

The detection circuit 413 is connected to the input terminal 411, for detecting the power supply state of the plurality of power source device 201-204. In a preferred embodiment of the present invention, the power supply state of the plurality of power source devices 201-204 can be directly measured from the power connectors of the input terminal 411. A combination of power supply state of the power source devices 201-204 can be represented by a signal, i.e., the combination of signals received by the detecting circuit 413 from the input terminal 411. Other methods for detection and for expressing a combination of the power supply state of a plurality of power source devices can also be applied to the present invention.

In the illustrated example, the power supply state of each power source device 201-204 may be represented by a code digit. For example, code digit 1 represents power good (normal), and code digit 0 represents failure or shutdown. In this way, for 4 power source devices there are totally 16 possible power supply state combinations, representable by 16 codes.

In the known technology, in order to ensure the normal operation of the PoE system having multiple power source devices, it is necessary to provide a mechanism for rapid shutting off power supplied to a sufficient number of power consuming devices, when any power source device fails. This mechanism can prevent the system from total shutting down, due to failure of a small number of power source device. In the known arts, such as the aforementioned patents, a look-up-table, call a power supply to power consumption look-up-table, is provided, to define the corresponding relation of a plurality of power supply state combination to a plurality of power consumption control combination. For example, when all the power source devices are operating normally (power supply state: 1, 1, 1, 1), all port, such as 8 ports, are in the power consumption state (powered consumption state: 1, 1, 1, 1, 1, 1, 1, 1). However, when one power source shuts down, specific ports, such as ports with a lower priority value, needs to be shut off power supply, i.e., their corresponding port switches need to be turned OFF. The corresponding relation of the then power supply state combination and the power consumption control combination can thus be expressed as (1, 1, 1, 0/1, 1, 1, 1, 1, 1, 1, 0). The remaining combinations of the look-up-table can be easily appreciated by any skilled person.

Among the above codes, the code indicating the power consumption state, i.e., the ON/OFF state of the port switch, in correspondence with one power supply state combination, can be referred to as a power consuming control combination. When it is expressed by a signal or a control signal, it is a power consuming control signal.

This kind of the conventional power supply to power consumption look-up-table will not work, if a PoE system has a large number of power consuming devices. One of the reasons is, although the number of the digit of each code in the power supply to power consumption look-up-table is not limited, a lengthy signal would be necessary, when the length of the power consumption control code is lengthy, for example, with 64, 128, 256 or more digits. The lengthy signal would make the system footprint larger and structure complicated, and offset all the advantages of using a look-up table. The use of a control device to control the power consumption of a greater number of electrical devices is already an expected application. To design a useful control device for the power over Ethernet system having relatively large number of power source/consuming devices, this problem must be overcome.

Although it is not desirable to be bound by any theory, the inventors found that all PoE systems use a serial bus. When a control signal is quite lengthy (the number of digits of the signals is quite large), the serial bus becomes suitable for carrying the control signals. Using the existing serial bus to transmit switch control signals to the plurality of port switches can eliminate the need for a large number of wires.

According to the design of the first embodiment of the present invention, the master controller 410 is not configured to generate power consumption control signals, for directly providing to the individual port switches 311-31N. In the present invention, the control signals generated by the master controller 410 is transmitted to one or more of the plurality of control circuits 421-42N, which in turn respectively provides the power consumption control signals to the individual port switch 311 to 31N. In order to shorten the process time and to achieve proper control, the invented control device 400 uses a serial signal bus 430 to transmit the control signals of the master controller 410 to the plurality of control circuits 421-42N, as well as data and control signals exchanged among the plurality of control circuits 421-42N. According to a preferred embodiment of the present invention, the serial signal bus 430 preferably uses the IIC communication protocol (Inter-Integrated Circuit Protocol).

To achieve the above objectives, the master controller 410 of the present invention provides a detection circuit. 413 in connection with the input terminal 411, to inspect the power supply state of each power source device and to generate a power supply state signal as a result of the inspection. Each signal represents one combination of the power supply state, as power good or failure of the plurality of power source devices. As a result, the inspection result of the detection circuit 413 represents a combination of power supply states of the power supply devices. The master controller 410 also provides a first look-up-table memory 415 for storing a first power supply to power consumption look-up-table, which indicates the corresponding relation between a plurality of power supply state combinations and a plurality of power consumption control combinations. In the preferred embodiments of this invention, the first power supply to power consumption look-up-table defines a corresponding relation between a plurality of power supply state signals and a plurality of power consumption control signals, and/or between a plurality of power supply state codes and a plurality of power consumption control signals. For details of the structure and content of this power supply to power consumption look-up-table, please refer to the foregoing description or any known prior art. In application, the content of the power supply to power consumption look-up-table may be set manually, or set by the master controller 410 automatically at the initial stage. The method of setting the contents of the power supply to power consumption look-up-table is also a known technology. Detailed description thereof is thus omitted.

The master controller 410 also provides a control signal generating circuit 414, which is connected to the detection circuit 413 and the first look-up-table memory 415. The control signal generating circuit 414 is configured to generate a power consumption control signal upon detection of a change in the power supply state signal by the detection circuit, and provide the power consumption control signal to the control circuits 421-42N, to be further described below. The picked-up power consumption control signal corresponds to the power supply state signal received by the detection circuit 413.

To achieve the above objective, the detection circuit 413 may be configured to generate a power supply state change signal when the received power supply state signal is different from the previous power supply state signal. After the control signal generating circuit 414 receives the power supply state change signal, a power consumption state change program is activated, whereupon it generates a power consumption control signal based on the power supply state signal newly received by the detection circuit 413. In application, the detection circuit 413 may wired the outputs of the plurality of power source device, before they enter the input terminal 411, whereby a change in the power supply state of any power source device would generate a power supply state change signal, to activate the power consumption state change operation. For details of such implementation, reference may be made to the prior art material described above.

FIG. 2 shows N control circuits 421-42N are connected to the serial signal bus 430, and are connected communicatively to the master controller 410 by the serial signal bus 430. All or most of the control signals are transmitted via the serial signal bus 430. The control circuits 421-42N are respectively connected with the port switches 311-31N to control the operation of the port switches 311-31N. Each port switch 311-31N controls the power consumption state of at least one communication port 301-30N (not shown in FIG. 2). When a switch is ON, the corresponding port receives power from the PoE system; otherwise, when the switch is OFF, the corresponding port receives no electrical power. Each control circuit 421-42N uses the power consumption state control signal to control the above-mentioned operation of the corresponding port switch 311-31N. Each of the communication ports 301-30N is connectable by a power consuming device (not shown).

In a preferred embodiment of the present invention, the respective control circuits 421-42N may further comprise a second look-up-table memory 416, for storing a second power supply to power consumption look-up-table. This second power supply to power consumption look-up-table defines the corresponding relation of a plurality of power supply state combinations and a plurality of power consumption state control combinations. In this embodiment, each of the plurality of power consumption state control combinations corresponds to a switch state combination of the port switches 311-31N connected to the control circuits 421-42N. In the application, the second power supply to power consumption look-up-table stored in the second look-up-table memory 461 is the first power supply to power consumption look-up-table stored in the look-up-table memory 415. In application, the second power supply to power consumption look-up-table defines a corresponding relation of a plurality of power supply state signals and a plurality of power consumption control signals and/or a corresponding relation of a plurality of power supply state codes and a plurality of power consumption control signals.

Therefore, in this embodiment, the master controller 410 may be configured to provide at the initial stage of the system, the first power supply to power consumption look-up-table pre-stored in the first look-up-table memory 415 to at least one of the plurality of control circuits. The so-called at least one means that it is not necessary for all control circuits 421-42N to provide a second look-up-table memory 461. Only one of the plurality of control circuits 421-42N, for example, the control circuit 421, needs to provide the second look-up-table memory 461. In such an implementation, the at least one control circuit. 421 stores the first power supply to power consumption look-up-table in the second look-up-table memory 416, after the table is received, for further use.

When the detection circuit 413 detects a change in the power-supply state signal, the control signal generating circuit 414 converts the newly received power supply state signal into a code and provides the code to the at least one control circuit 421, to function as the power supply state change signal. In application, the code can be any code representing one of all possible combinations of the power supply state. The simplest way is to express the above-mentioned signal of power supply state in a binary code. The binary code may be directly converted into a series of signals, such as a pulse series, representing the hexadecimal value of the binary code. For example, when the signal of the power supply state is 0101, the value of 0101 is converted into code 5 to generate a pulse of 0000 0000 0001 0000. By simply adding an operation code to the power supply state code, the code may be transmitted to the plurality of control circuits 421-42N via a serial bus at the same time through a well-known communication protocol, such as the aforementioned IIC communication protocol, without adding additional lines.

In this particular embodiment, after the at least one control circuit 421 or the plurality of control circuits 421-42N receives the power supply state code, it can pick up a corresponding power consumption control signal from the power supply to power consumption look-up-table stored in the second look-up-table memory 461 and transmit it to all port switches 311 to 31N in connection with the control circuit 421 or the plurality of control circuits 421-42N. In the case where only one control circuit 421 is equipped with the second look-up-table memory 461, the control circuit 421 can also transmit a picked up group of power consumption control signals to others control circuits 422-42N via the serial signal bus 430, whereby each of the other control circuits 422-42N transmits the corresponding power consumption control signal to the connected port switches.

Figure 3:
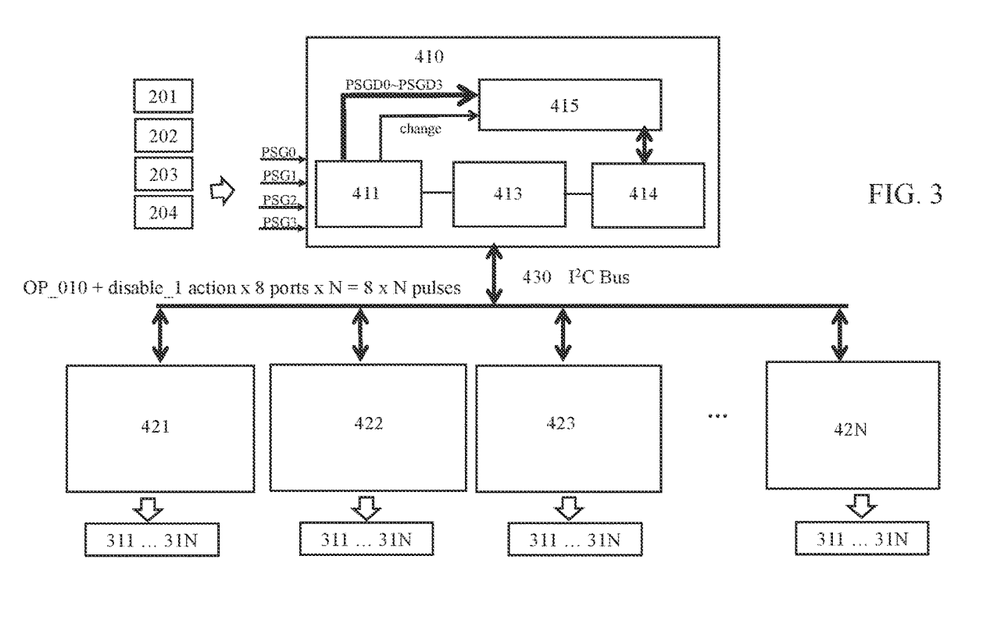
FIG. 3 shows a schematic structural diagram of a second embodiment of the invented control device for power over Ethernet system having multiple power source device.

FIG. 3 is schematic structural diagram of a second embodiment of the invented control device for power over Ethernet system having multiple power source device. The components that are the same as those in FIG. 2 will use the same or similar reference numbers.

The circuit structure and features of the second embodiment are basically the same as or similar to the first embodiment, except that, as shown in FIG. 3, the control signal generating circuit 414 picks up a power consumption control code corresponding to a newly received power supply state signal from the power supply to power consumption look-up-table and uses the code to generate the power consumption control signal directly, after the detection circuit 413 generates the power supply state change signal. The control signal so generated is then transmitted to the signal bus 430. To be more specific, when the detection circuit 413 detects a change in the power supply state combination, the control signal generation device 414 picks up a power consuming control code corresponding to the newly received power supply state signal from the power supply to power consumption look-up-table, and uses the code as the power consumption control signal. It then provides the control signal to the plurality of control circuits 421-42N via the signal bus 430.

In order to make the power consumption control signal shorter, a power consumption control signal corresponding to a power supply state combination can be divided by, for example, the number of the control circuits 421-42N, to obtain multiple power control signals. Each time only a partial power consumption control signal is transmitted. As mentioned above, because of the serial signal bus 430, the partial power consumption control signal will be received by the right control circuit 421-42N as long as a correct operation code is added. It takes about 128 clock cycles to transmit 16 power consumption state control signals in this way, and the operation of powering off the corresponding port switch can still be completed within the required time. In such an embodiment, the multiple power consumption control signals may contain codes indicating related control circuits. In such embodiments, one (partial) power consumption control signal can correspond to one or more control circuits. Therefore, the number of the control circuits is identical or is a multiple of the number of the (partial) power consumption state control signals.

In such embodiments, each control circuit 421-42N provides the control signal a respectively corresponding port switch 311 to 31N, to enable or disable power supplied to the individual communication ports 301-30N, after receiving the control signal. In such embodiments, each control circuit 421-42N does not need to be equipped with a look-up-table memory.

Figure 4:
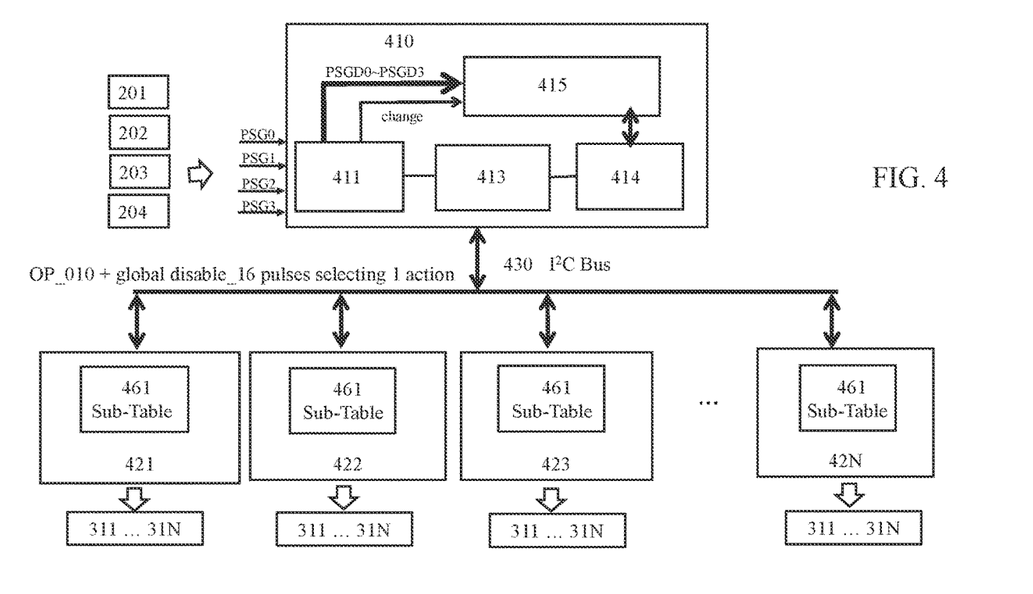
FIG. 4 shows a schematic structural diagram of a third embodiment of the invented control device for power over Ethernet system having multiple power source device.

FIG. 4 is schematic structural diagram of a third embodiment of the invented control device for power over Ethernet system having multiple power source device. The components that are the same as those in FIG. 2 and FIG. 3 will use the same or similar reference numbers.

Circuit structure and features of the third embodiment are substantially the same or similar with the first and second embodiment, except that, as shown in FIG. 4, in the initial stage of the system, the master controller 410 divides the power supply to power consumption look-up-table pre-stored in the first look-up-table memory 415 into a plurality of sub-tables, and provides each sub-table to the corresponding one of the plurality of control circuit 421-42N. Each sub-table only defines the corresponding relation of a plurality of power supply state combination and a plurality of power consumption control signal to be provided to the port switches 311-31N connected to the respective control circuits 421-42N. The plurality of control circuit 421-42N, in turn, is configured to store the sub-table in the second look-up-table memory 461, after receiving the sub-table, and to pick up a power consumption control signal corresponding to a received power supply state signal from the power supply to power consumption look-up-sub-table and to provide the control signal to the port switches 311-31N in connection with the respective control circuits 421-42N, after the power supply state code is received.

In other words, in the embodiment shown in FIG. 2, in the second look-up-table memory 461 of the at least one control circuit 421, a full table of the power supply to power consumption look-up-table may be stored (see FIG. 2). The full table defines the corresponding relation of the plurality of power supply state combination and the plurality of power consumption state control combination of all port switches 311-31N. On the other hand, in the embodiment of FIG. 4, in the second look-up-table memory 461 of each control circuit 421-42N, a sub-table of the power supply to power consumption look-up-table is stored. The sub-tables define the corresponding relation of the plurality of power supply state combination and the plurality of power consumption control signals to be provided to the port switches 311-31N that are connected to the respective control circuits 421-42N, only.

In the embodiment of FIG. 4, when the master controller 410 detects a change in the power supply state signal, it transmits the power supply state signal, preferably in a form of a power supply state code, to the control circuits 421-42N via the serial signal bus 430. Control circuits 421-42N then uses the power supply state code to pick up a corresponding control signal from the power supply to power consumption look-up-sub-table and provides the control signal to each of the port switches 311 to 31N connected to the respective control circuit 421-42N. The power consumption state change operation is thus accomplished. In the example shown in FIG. 4, the power supply state code includes an operation code and a code of the same number of pulses as that of the plurality of power supply state combination, and is transmitted to all control circuits 421-42N in a single step. Only a few steps are required to complete the operation of powering off the corresponding port switches.

Figure 5:
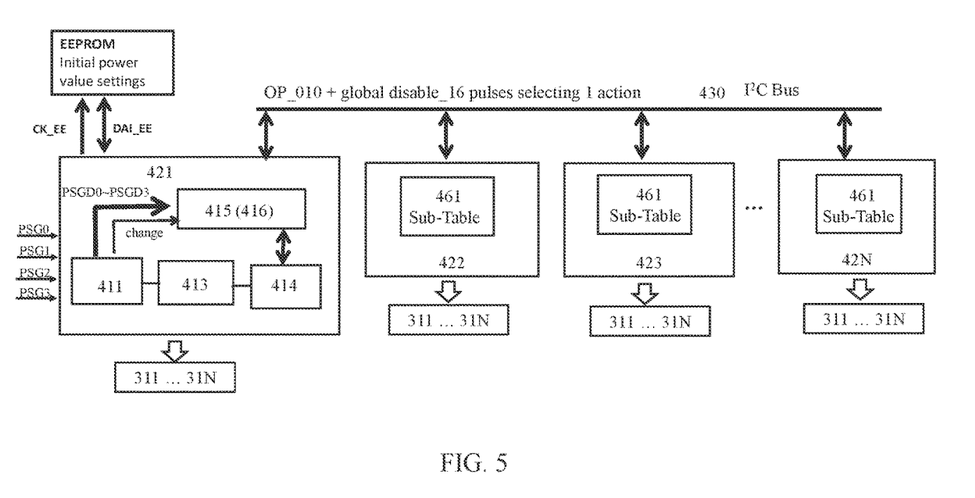
FIG. 5 shows a schematic structural diagram of a fourth embodiment of the invented control device for power over Ethernet system having multiple power source device.

FIG. 5 is schematic structural diagram of a fourth embodiment of the invented control device for power over Ethernet system having multiple power source device. The components that are the same as those in FIGS. 2-4 will use the same or similar reference numbers.

This embodiment can be regarded as a modification of the embodiment in FIG. 4. As shown in FIG. 5, among the control circuits 421-42N of the fourth embodiment, the role of the control circuit 421 is equivalent to the master controller 410 in the previous embodiments. The control circuit 421 has its input terminal 411 connected to the plurality of power source devices 201-204, and comprises a detection circuit 413 and a control signal generating circuit 414, which are equivalent to the detection circuit 413 and the control signal generating circuit 414 of the first embodiment. In addition, the control circuit 421 is equipped with a look-up-table memory 415 to store a power supply to power consumption look-up-table. What is different from the master controller 410 of previous embodiments is, the control circuit 421 is connected with a plurality of port switch 311 to 31N, just like the other control circuits 422-42N. The EEPROM in the control apparatus 400 shown in this figure is used to provide an initial power setting for access by the control circuit 421, for initial value setting.

The control circuit 421 is configured to read the initial power setting value from the EEPROM during the system startup stage, and divide the power supply to power consumption look-up-table stored in advance in the look-up-table memory 415 into a plurality of sub-tables, and provide each sub-table to one of the other control circuits 422-42N. Each sub-table only defines the corresponding relation of the plurality of power supply state combination and the plurality of power consumption control signals of the port switches 311-31N connected to the respective control circuits 421-42N.

In the embodiment of FIG. 5, when the control circuit 421 detects a change in the power supply state combination, it transmits a power supply state signal, preferably a power supply state code, to the other control circuits 422-42N via the serial signal bus 430. The control circuit 421 and the other control circuits 421-42N then uses the power supply state code to pick up a corresponding power consumption control signal from the power supply to power consumption look-up-sub-table, or the full table, and provides the control signal to each of the port switches 311 to 31N connected to the respective control circuit 421-42N. The power consumption state change operation is thus accomplished. In the example shown in FIG. 5, the power supply state code includes an operation code and a code of the same number of pulses as that of the plurality of power supply state combination, and is transmitted to the control circuits 422-42N, other than the control circuit 421, in a single step. Only a few steps are required to complete the operation of powering off the corresponding port switches.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A power over Ethernet (PoE) system having multiple power source devices, comprising:
   a plurality of power source devices;
   a plurality of communication ports, each to be connected by a power consuming device, to establish a signal and electrical power connection with the power consuming device; each communication port being controlled by a port switch;
   a control device in connection with the plurality of power source devices and the plurality of communication ports via a network cable, to convert power supplied by the power source devices into electrical power for use by power consuming devices connected to corresponding communication ports, and to generate power consumption control signals for control of power supplied to respective communication ports from the plurality of power source devices;
   wherein the control device comprises:
   a master controller, comprising:
      an input terminal for connecting a plurality of power source devices to receive a power supply state signal representing a power supply state combination of the plurality of power source devices;
      a detection circuit connected to the input terminal for detecting the power supply state signal and for generating a power supply state change signal, when a power supply state signal received by the detection device is different from a previously received power supply state signal;
      a first look-up-table memory to store a first power supply to power consumption look-up-table defining a corresponding relation of a plurality of power supply state combination to a plurality of power consumption control combination; and
      a control signal generating circuit connected to the detection circuit and configured to: generate, upon receipt of a power supply state change signal, a power supply state code corresponding to the received power supply state signal;
   a plurality of control circuits connected to the master controller and a plurality of port switches, each port switch controlling a power consumption state of at least one port to be connected by a power consuming device;
   wherein each control circuit is configured to generate, upon receipt of the power supply state code, the power consumption control signal corresponding to the power supply state code and to provide the power consumption control signals to corresponding port switches, to determine a power consumption state of corresponding ports; and
   a signal bus connected to the master controller and the plurality of control circuits; wherein, the signal bus is a serial bus.

2. The control device for PoE system according to claim 1, wherein the first and/or second power supply to power consumption look-up-table defines a corresponding relation of a plurality of power supply state signals and a plurality of power consumption control signals and/or a corresponding relation of a plurality of power supply state codes and a plurality of power consumption control signals.

3. The control device for PoE system according to claim 1, wherein the signal bus uses the IIC communication protocol.

4. The control device for PoE system according to claim 1,
   wherein at least one control circuit comprises a second look-up-table memory, to store a second power supply to power consumption look-up-table,
   wherein the master controller is configured to: in the initial stage of the system, provide the first power supply to power consumption look-up-table stored in the first look-up-table memory to the at least one control circuit and to convert, upon receipt of the power supply state change signal, the received power supply state signal into a power supply state code and provide the code to the at least one control circuit; and
   wherein the at least one control circuit is configured to: after receiving the power supply to power consumption look-up-table provided by the master controller, store the power supply to power consumption look-up-table in the second look-up-table memory, and to pick up, after receiving the power supply state code, a corresponding power consumption control signal from the power supply to power consumption look-up-table and provide the power consumption control signal to a port switch in connection with the control circuit.

5. The control device for PoE system according to claim 4, wherein the first and/or second power supply to power consumption look-up-table defines a corresponding relation of a plurality of power supply state signals and a plurality of power consumption control signals and/or a corresponding relation of a plurality of power supply state codes and a plurality of power consumption control signals.

6. The control device for PoE system according to claim 4, wherein the signal bus uses the IIC communication protocol.

7. The control device for PoE system according to claim 1,
   wherein each control circuit further comprises a second look-up-table memory, to store a second power supply to power consumption look-up-table;
   wherein the master controller is configured to: in the initial stage of the system, provide the first power supply to power consumption look-up-table stored in the first look-up-table memory to the plurality of control circuit, and to convert, upon receipt of the power supply state change signal, the received power supply state signal into a power supply state code and provide the code to the plurality of control circuits; and
   wherein the plurality of control circuit is configured to: after receiving the power supply to power consumption look-up-table provided by the master controller, store the power supply to power consumption look-up-table in the second look-up-table memory, and to pick up, after receiving the power consumption state code, one corresponding power consumption control signal from the power supply to power consumption look-up-table, and provide the power consumption control signal to a port switch in connection with the control circuit.

8. The control device for PoE system according to claim 7, wherein the first and/or second power supply to power consumption look-up-table defines a corresponding relation of a plurality of power supply state signals and a plurality of power consumption control signals and/or a corresponding relation of a plurality of power supply state codes and a plurality of power consumption control signals.

9. The control device for PoE system according to claim 7, wherein the signal bus uses the IIC communication protocol.

10. The control device for PoE system according to claim 1,
wherein each control circuit further comprises a second look-up-table memory, to store a power supply to power consumption look-up-table;
wherein the master controller is configured to: in the initial stage of the system, divide the first power supply to power consumption look-up-table stored in the first look-up-table memory into a plurality of sub-tables and provide the sub-table to corresponding one of the plurality of control circuit;
wherein the plurality of control circuit is configured to: after receiving the power supply to power consumption look-up-sub-table provided by the master controller, store the power supply to power consumption look-up-sub-table in the second look-up-table memory, and to pick up, after receiving the power consumption state code, a corresponding power consumption control signal from the power supply to power consumption look-up-sub-table, and provide the power consumption control signal to a port switch in connection with the control circuit.

11. The control device for PoE system according to claim 10, wherein the first and/or second power supply to power consumption look-up-table defines a corresponding relation of a plurality of power supply state signals and a plurality of power consumption control signals and/or a corresponding relation of a plurality of power supply state codes and a plurality of power consumption control signals.

12. The control device for PoE system according to claim 10, wherein the signal bus uses the IIC communication protocol.

13. The control device for PoE system according to claim 1,
wherein the master controller is connected to a plurality of port switches, each controlling power supplied to at least one port;
wherein each control circuit further comprises a second look-up-table memory, to store a power supply to power consumption look-up-table;
wherein the master controller is further configured to: in the initial stage of the system, provide the first power supply to power consumption look-up-table stored in the first look-up-table memory to the plurality of control circuit, and to convert, upon receipt of the power supply state change signal, the received power supply state signal into a power supply state code and provide the code to the plurality of control circuits;
wherein the plurality of control circuit is further configured to: after receiving the power supply to power consumption look-up-table provided by the master controller, store the power supply to power consumption look-up-table in the second look-up-table memory, and to pick up, after receiving the power consumption state code, one corresponding power consumption control signal from the power supply to power consumption look-up-table, and provide the power consumption control signal to a port switch in connection with the control circuit; and
wherein the master controller is further configured to: after generating the power consumption state code, pick up one corresponding power consumption control signal from the power supply to power consumption look-up-table, and provide the power consumption control signal to a port switch in connection with the master controller.

14. The control device for PoE system according claim 13, wherein the first and/or second power supply to power consumption look-up-table defines a corresponding relation of a plurality of power supply state signals and a plurality of power consumption control signals and/or a corresponding relation of a plurality of power supply state codes and a plurality of power consumption control signals.

15. The control device for PoE system according to claim 13, wherein the signal bus uses the IIC communication protocol.

16. The control device for PoE system according to claim 1, wherein the power supply state signal has the same number of code digit as the number of the plurality of power source devices.

17. The control device for PoE system according to any of claim 1, wherein the power supply state code is equivalent to a result of converting the power supply state signal into a serial signal.

18. The control device for PoE system according to claim 4, wherein the at least one control circuit is configured to pick up a power consumption control signal from the power supply to power consumption look-up-table and provide the power consumption control signal to other control circuits via the signal bus.

19. The control device for PoE system according to claim 18, wherein the at least one control circuit picks up a power consumption control data corresponding to the power supply state code from the power supply to power consumption look-up-table, to generate the power consumption control signal.

20. A power over Ethernet system having multiple power source devices, comprising:
a plurality of power source devices;
a plurality of communication ports, each to be connected by a power consuming device, to establish a signal and electrical power connection with the power consuming device; each communication port being controlled by a port switch;
a control device in connection with the plurality of power source devices and the plurality of communication ports via a network cable, to convert power supplied by the power source devices into electrical power for use by power consuming devices connected to corresponding communication ports, and to generate power consumption control signals for control of power supplied to respective communication ports from the plurality of power source devices;
wherein the control device comprising:
a master controller, comprising:
an input terminal, connected to the plurality of power source devices to receive a power supply state signal representing a combination of power supply state of the plurality of power source devices;
a detection circuit connected to the input terminal to detect a change in the power supply state combination according to the received power supply state combination signal;
a first look-up-table memory to store a first power supply to power consumption look-up-table defining a corresponding relation of a plurality of power supply state combination and a plurality of power consuming control combination; and
a control signal generating circuit connected to the detection circuit and configured to: pick up, after detection of a change in the power supply state combination by the detection circuit, a power consumption control data corresponding to the received power supply stage signal from the first power supply to power consumption look-up-table, divide the power consumption control data into a plurality of power consumption control signals and output the power consumption control signals;
wherein each power consumption control signal corresponds to at least one control circuit; and
a plurality of control circuit connected to the master controller and a plurality of port switches, each port switch controlling a power consumption state of at least one port for connection by a power consuming device;
wherein each control circuit is configured to: upon receipt of the power consumption control signal, provide the power consumption control signals to corresponding port switches, to enable or disable power supplied to respective ports; and
a signal bus connected to the master controller and the plurality of control circuits; wherein, the signal bus is a serial bus.

21. The control device for PoE system according to claim 20, wherein the control signal generating circuit is configured to transmit one of the plurality of power consumption control signals at a time.

22. The control device for PoE system according to claim 20, wherein the quantity of the control circuits is identical or is a multiple of the number of the power consumption control signals.

23. The control device for PoE system according to any of claim 20, wherein the first power supply to power consumption look-up-table defines a corresponding relation of a plurality of power supply state signals and a plurality of power consumption control signals and/or a corresponding relation of a plurality of power supply state codes and a plurality of power consumption control signals.

24. The control device for PoE system according to any of c claim 20, wherein the signal bus uses the IIC communication protocol.

25. The control device for PoE system according to any of claim 20, wherein the power supply state signal has the same number of code digit as the number of the plurality of power source devices.

* * * * *